INVENTORS:
ROBERT P. ZUNDEL
CURTIS F. DRUCKREY
BY
ATTORNEYS.

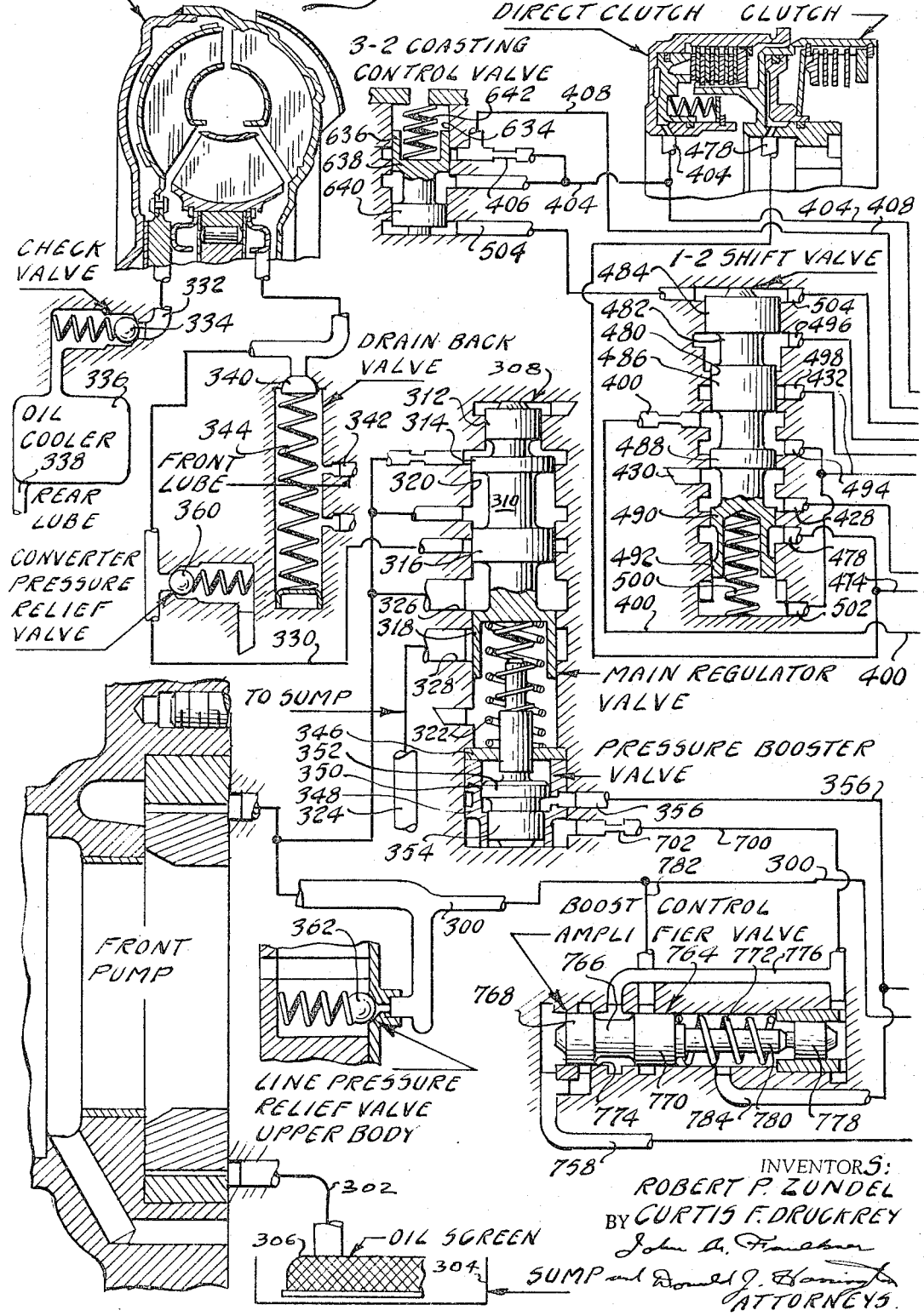

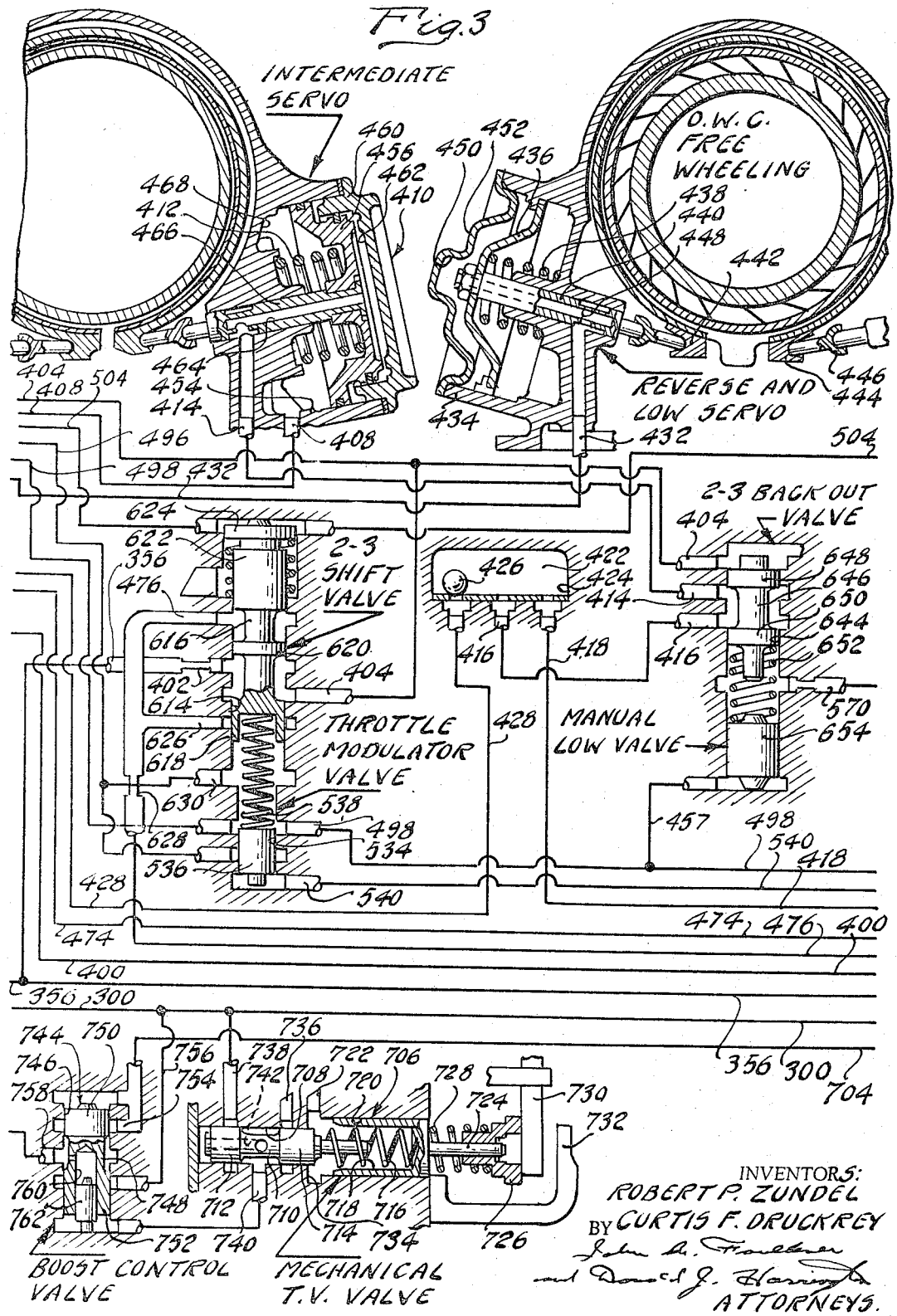

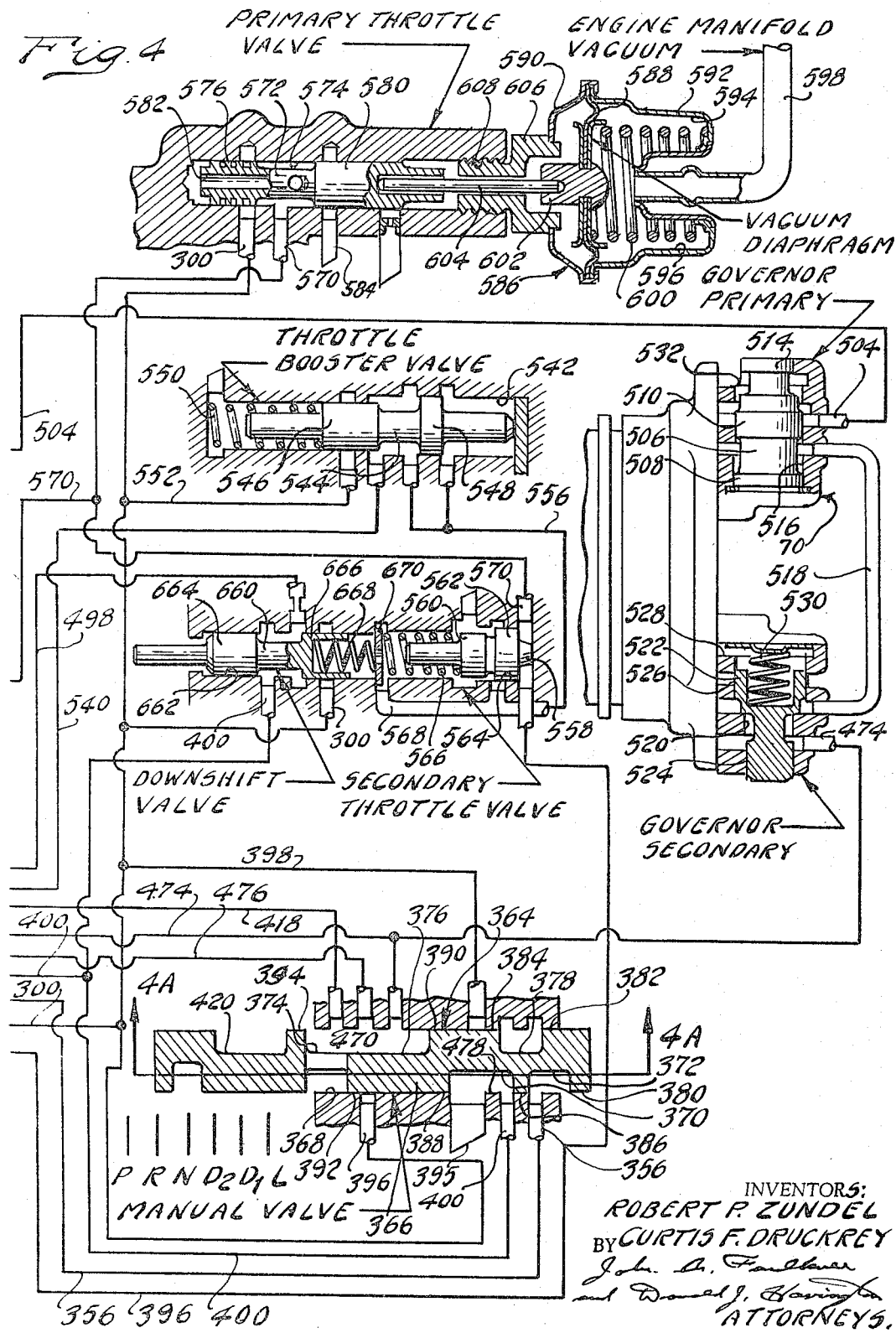

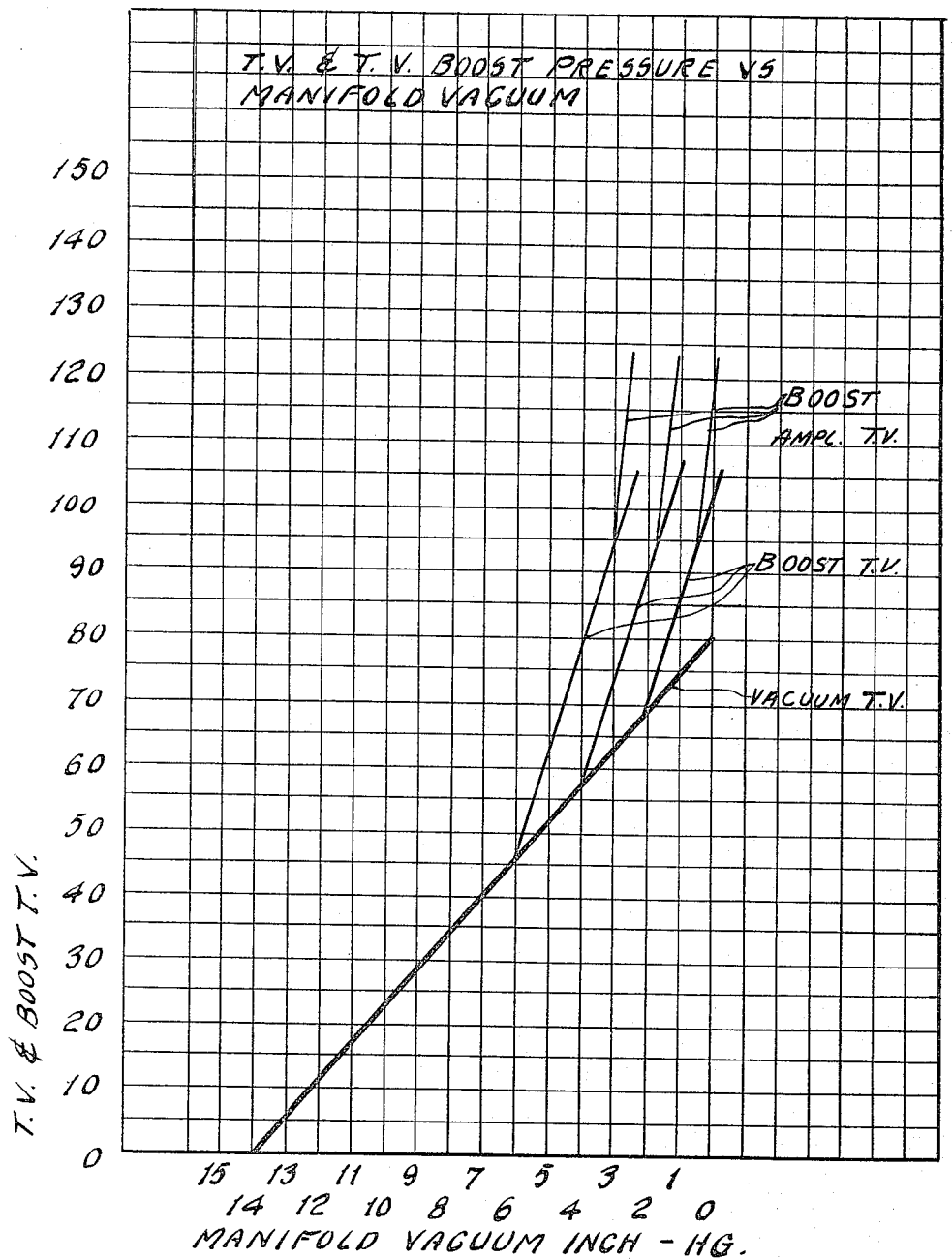

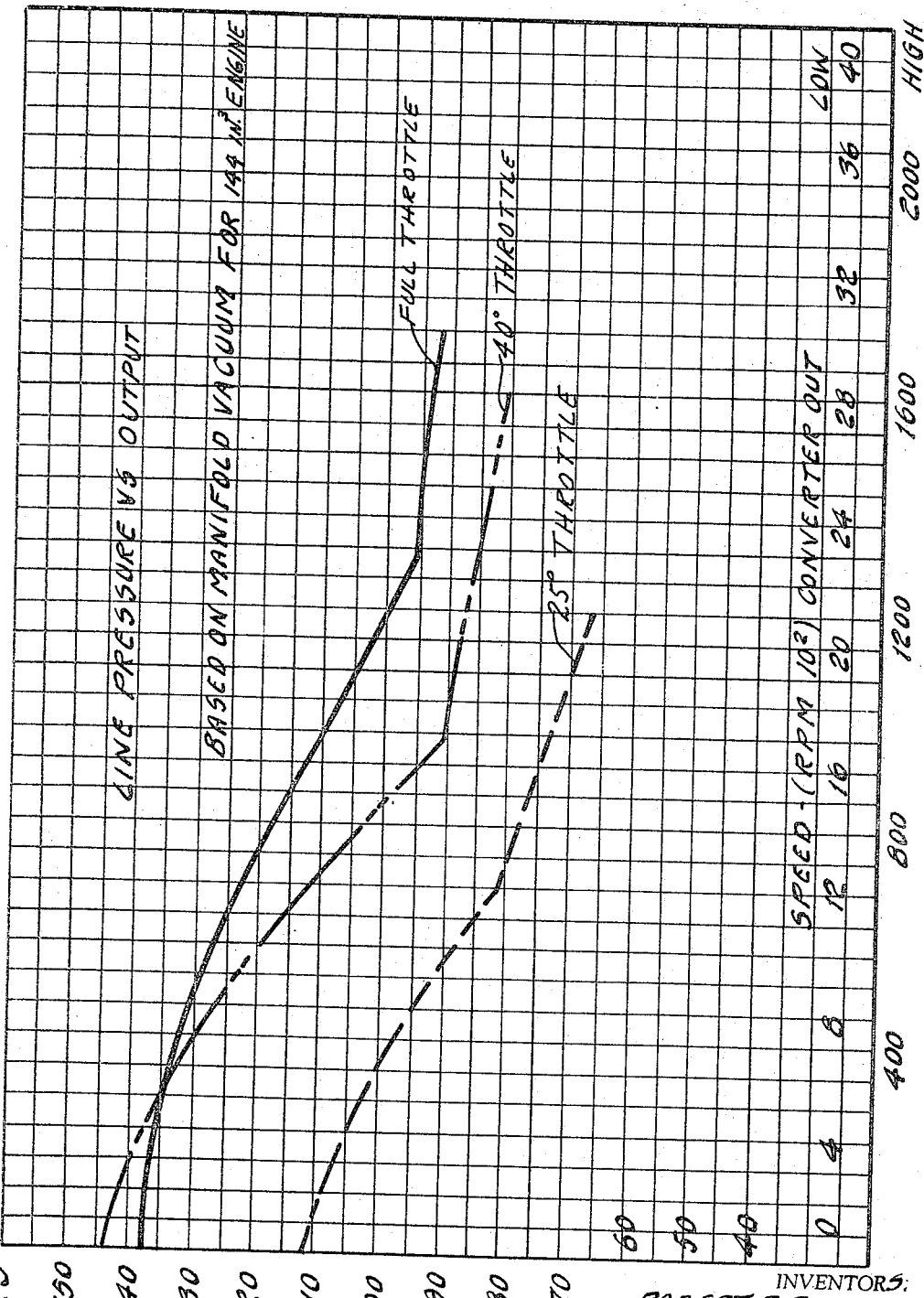

United States Patent Office 3,308,676
Patented Mar. 14, 1967

3,308,676
ENGINE MANIFOLD PRESSURE RESPONSIVE CONTROL SYSTEM FOR A MULTIPLE RATIO POWER TRANSMISSION MECHANISM
Robert P. Zundel, Birmingham, and Curtis F. Druckrey, Livonia, Mich., assignors to Ford Motor Company, Dearborn, Mich., a corporation of Delaware
Filed Aug. 17, 1964, Ser. No. 390,165
10 Claims. (Cl. 74—472)

Our invention relates generally to automatic control valve systems for multiple speed-ratio power transmission mechanisms in an automotive vehicle driveline that includes an internal combustion engine. More particularly, our invention relates to a control valve circuit for an automatic power transmission mechanism that is capable of establishing an optimum control pressure level in the various regions of the circuit regardless of varying operating requirements.

The improvements of our invention may be adapted readily for use in the automatic control valve system disclosed in co-pending application Ser. No. 277,855 entitled, "Multiple Speed Transmission," which was filed by Richard L. Leonard and Robert P. Zundel. This co-pending application is assigned to the assignee of our instant invention.

In a transmission mechanism of the type disclosed in application Ser. No. 277,855 there are multiple planetary gear elements that cooperate to define plural torque delivery paths from a turbine driven shaft to a power output member. The relative motion of the elements of the gear units is controlled by means of fluid pressure operated clutch and brake servos, and an engine driven pump in the circuit acts as a source of control pressure. Conduit structure is provided for distributing the pump pressure to the various servos. The conduit structure is defined in part by fluid pressure distributor valves that respond to changes in the vehicle speed and to changes in the manifold pressure of the internal combustion engine.

A main regulator valve assembly establishes a controlled pressure level for the circuit, and its calibration depends upon the torque transmitting requirements of the servos.

It is desirable to vary the magnitude of the circuit pressure level established by the regulator valve assembly so that an increased pressure will be made available to the servos as the torque requirements of the driveline increase. For this reason engine manifold pressure has been used in arrangements of this type to provide a control signal to which the regulator valve assembly responds. Various systems have been employed also for establishing a signal that is related to the driven speed of the power output member and for distributing that speed signal to the regulator valve assembly to cause a reduction in the effective line pressure upon increasing driven speed of the power output member for any given engine throttle setting.

In our improved control system we have utilized engine intake manifold pressure as the sole regulating agent for initiating line pressure regulation. This control is accomplished independently of any auxiliary valve system for establishing a so-called speed signal that is determined by the driven speed of the power output member. The provision of an improved valve system of this type is an object of our invention.

It is a further object of our invention to provide a line pressure regulating valve system in a circuit of the type above set forth wherein the magnitude of the system pressure is made dependent upon the magnitude of the engine intake manifold pressure and wherein provision is made for augmenting the response of the regulator valve assembly to changing manifold pressure when the torque transmitting requirements of the driveline are increased.

It is another object of our invention to provide a regulator valve system of the type above set forth wherein provision is made for varying the speed at which the aforementioned augmentation is achieved so that the transition point will occur at progressively increasing output speeds as the engine throttle setting is advanced.

It is a further object of our invention to provide a control valve system of the type above set forth wherein provision is made for establishing the optimum speed-ratio shift points and shift quality regardless of varying operating conditions.

Figure 1:
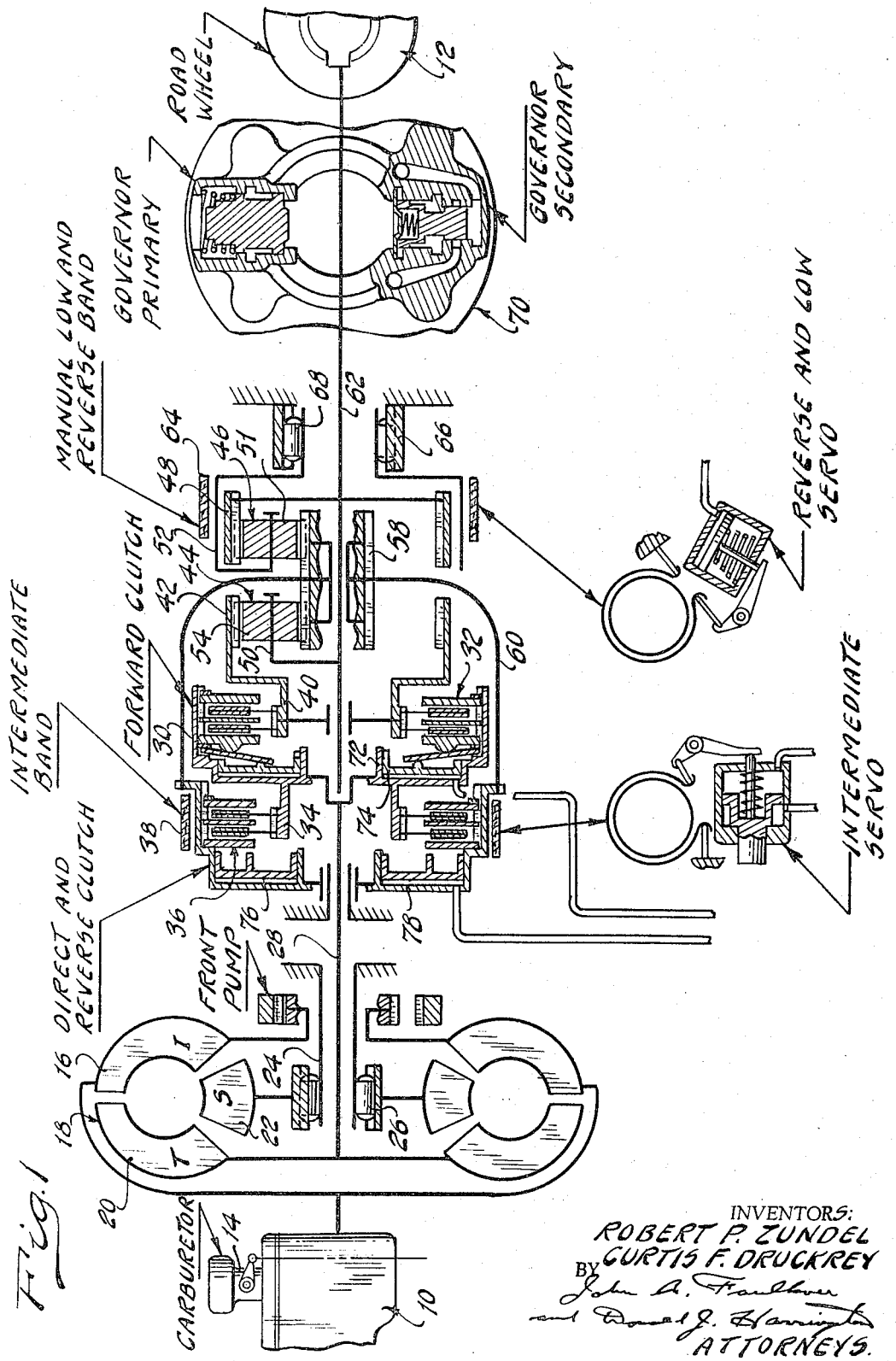
FIGURE 1 shows in schematic form a multiple speed ratio power transmission mechanism capable of being controlled by our improved valve system.

For the purpose of describing more particularly the improvements of our invention, reference will be made to the accompanying drawings, wherein:

FIGURES 2, 3 and 4 show in schematic form a valve system embodying the improvements of our invention;

FIGURE 5 shows in graphic form the relationship between engine manifold vacuum and both the signal upon which it depends and the modified signal;

FIGURE 6 shows in graphic form the relationship between the regulated circuit pressure and driven speed of the power output member;

*Description of gearing of FIGURE 1*

Referring first to FIGURE 1, numeral 10 designates generally an internal combustion engine for an automotive vehicle driveline. The road wheels shown generally at 12 are connected to driven portions of the transmission mechanism through a suitable driveline and differential gear arrangement.

The engine 10 includes a carburetor-controlled, air-fuel mixture intake manifold 14. The carburetor includes a throttle valve that may be opened by the vehicle operator in the usual fashion by means of an accelerator linkage mechanism.

The crankshaft of engine 10 is connected to the impeller 16 of a hydrokinetic torque converter unit 18. The converter 18 includes also a bladed turbine 20 and a bladed stator 22. The bladed passages of the impeller 16, the turbine 20 and the stator 22 define a toroidal fluid flow circuit. The impeller is connected drivably to a positive displacement front pump which acts as a pressure source for the control system that will be described subsequently.

The stator 22 is situated between the fluid flow exit section of the turbine 20 and the fluid flow entrance section of the impeller 16. It is mounted rotatably upon a stationary sleeve shaft 24. An overrunning brake 26 provides a one-way connection between shaft 24 and stator 22 so that rotation of the stator in a direction opposite to the direction of rotation of the impeller is prevented, although freewheeling motion in the other direction is permitted.

Turbine 20 is connected directly to turbine shaft 28. This shaft is connected to an outer element of a forward drive multiple disc clutch 32. It is connected also to an inner element 34 of a direct and reverse multiple disc clutch 36. An intermediate brake band 38 surrounds the outer element of clutch 36. The brake band 38 can be applied and released by means of the intermediate servo which is schematically indicated in FIGURE 1. This servo will be described more particularly with reference to FIGURE 3.

The inner element 40 of the clutch 32 is connected directly to the ring gear 42 of a first simple planetary gear unit 44. A second planetary gear unit 46 also is provided. It includes a ring gear 48, planet pinions 51 and carrier 52 which rotatably supports the pinions 51. Planetary gear unit 44 includes planetary pinions 54 which are rotatably journaled upon a carrier 50. A sun gear 58 is common to both of the gear units 44 and 46. This common sun gear is connected by means of a drive shell 60 to the brake drum about which the brake band 38 is positioned. Carrier 50 and ring gear 48 are connected directly to a power output shaft 62.

Carrier 52 defines a brake drum that is surrounded by a reverse and low speed ratio brake band 64. This brake band can be applied and released by means of a reverse and low servo as indicated in FIGURE 1. This servo also will be described more particularly with reference to FIGURE 3.

A stationary overrunning brake race 66 is connected to the stationary housing for the transmission mechanism. A cooperating inner race is connected to the carrier 52. Overrunning brake elements 68 are situated between the races, one of which may be cammed, so that the driving torque reaction acting upon the carrier 52 can be transferred to the housing.

Low speed ratio forward drive operation is accomplished by engaging the clutch 32. Turbine torque developed by the turbine 20 is distributed through shaft 28 and through the clutch 32 to the ring gear 42. Carrier 52 acts as a reaction member and is held against rotation in one direction by the brake shown in part at 68. Carrier 50 is driven in a forward driving direction at a reduced ratio. Sun gear 58 is rotated in a direction opposite to the direction of rotation of carrier 50. This imparts a positive driving torque to the ring gear 48 which in turn is transmitted to the power output shaft 62. Thus, a split torque delivery path is provided.

To establish intermediate speed ratio operation it merely is necessary to engage the intermediate speed-ratio brake band 38. This anchors sun gear 58. Carrier 50 and shaft 62 then are driven at an increased speed-ratio that is greater than the low speed-ratio but less than unity. The overrunning brake shown in part at 68 freewheels under these conditions and the planetary gear unit 46 is inactive.

To establish third or direct forward drive speed-ratio, brake band 38 is released and clutch 36 is applied. Clutch 32 is applied during operation in all of the forward driving speed ratios. Since both clutches now are applied, the ring gear 42 becomes connected to the sun gear 58. Thus, the elements of the planetary gear system rotate in unison.

To establish reverse drive operation, brake band 38 is released and brake band 64 is applied. Also, clutch 36 is applied and clutch 32 is released. Turbine torque then is delivered directly from shaft 28 and through clutch 32 and drive shell 60 to the sun gear 58. Carrier 52 acts as a reaction member since it is held stationary by brake band 64. Ring gear 48 is driven in a direction opposite to the direction of rotation of the shaft 28 at a reduced absolute speed-ratio.

Continuous operation in the forward drive, low speed-ratio range can be achieved by applying band 64, releasing band 38 and releasing clutch 36 while clutch 32 remains applied. The carrier 52 then is inhibited from rotation in either direction and is capable therefore of accommodating coast braking reaction torque as the driven member overruns the driving member. A two-stage governor valve mechanism 70 is connected drivably to the power output shaft 62. This governor valve mechanism forms a part of the control circuit of FIGURES 2, 3 and 4 and functions to establish a pressure signal that is proportional in magnitude to the driven speed of the driven member 62.

The clutch 32 can be applied by a clutch servo that includes an annular piston 74 situated within an annular cylinder 72. The cylinder and piston cooperate to define an annular fluid pressure chamber through which fluid can be admitted to create a clutch engaging pressure on the clutch discs. In a similar fashion the clutch 36 can be actuated by a pressure operated servo that includes a piston 76 slidably situated within an annular cylinder 78. The cylinder 72 forms a part of the clutch element 30 of the clutch 32, and the cylinder 78 forms a part of the brake drum for the brake band 38.

*Description of control system of FIGURES 2, 3 and 4*

Referring next to FIGURES 2, 3 and 4, the front pump is adapted to supply fluid under pressure to a main line pressure passage 300. A fluid intake passage 302 communicates with an intake port for the front pump and supplies fluid to the front pump from an oil sump 304 within which is situated an oil screen 306.

A main regulator valve is designated generally by reference character 308. It includes a valve spool 310 having spaced valve lands 312, 314, 316 and 318. Each of these valve lands cooperates with a corresponding internal valve land formed in a valve spool chamber 320.

Valve spool 310 is urged in an upward direction as viewed in FIGURE 2 by a valve spring 322.

Passage 300 communicates with the valve chamber 320 at a location intermediate valve lands 318 and 316. It communicates also with chamber 320 at a second location between valve lands 314 and 316 and at a third location between valve lands 312 and 314. The latter two valve lands are of differential diameter and the differential area defined thereby is subjected to the pressure in passage 300. The resulting force opposes and balances the spring force of spring 322 when the valve element assumes a regulating position.

A low pressure return passage 324 communicates with valve chamber 320 at a location adjacent high pressure intake port 326. When the main regulator valve assumes a regulating condition, valve land 318 uncovers low pressure port 328 communicating with passage 324. A controlled degree of by-pass then is established and the resulting pressure in passage 300 is maintained at a desired regulated value that depends upon the calibration of the main regulator valve.

During initial starting of the vehicle, pressure develops in the control circuit initially when the valve spool 310 is in an upward position. Under these circumstances, port 328 is blocked. As pressure begins to develop in the passage 300, however, land 316 uncovers a converter feed passage 330. This passage 330 is uncovered prior to the time port 328 is uncovered. Thus priority is given to the pressure requirements of this passage 330 before pressure is made available to the control circuit.

Converter feed passage 330 extends to the inlet side of the hydraulic torus circuit of the converter.

A converter return flow passage 332 communicates with the flow exit portion of the torus circuit of the converter. The return flow is directed through passage 332 and through a converter check valve 334 into an oil cooler 336. The fluid then passes from the oil cooler to a rearward lubricating circuit which is defined in part by the central lubricating oil passage 338 formed in power output shaft 62. Fluid may be distributed from this passage 338 to the various bearing elements through radical branch passages as indicated best in FIGURE 1.

Situated in parallel relationship with respect to converter feed passage 330 is a drain back valve 340. This valve establishes communication between passage 330 and a front lubrication oil circuit 342. Fluid is distributed from this circuit 342 to the various bearing elements through appropriate radial pasasges. A portion of passage 342 is formed in stationary extension 108 as indicated in FIGURE 1.

The drain back valve is lightly loaded by means of a spring 344. It is adapted to become unseated when the pressure in passage 330 reaches a value of approximately 5 p.s.i. When the vehicle engine is stopped following driving operation, the control circuit pressure of course will decrease to zero. The drain back valve, however, will establish a so-called fluid lock in the torus circuit of the hydrokinetic torque converter thereby allowing the torque converter circuit to remain filled. It thus is conditioned for immediate operation upon restarting the engine. The fluid in the torque converter will not drain past the drain back valve into the lube circuit by reason of the spring pressure that is applied to the valve.

Located at the base of the main regulator valve is a spring plate 346. It is held in a fixed position against an internal valve shoulder by means of a cylindrical insert 348. Disposed within this insert 348 is a shuttle valve piston 350 which is identified in FIGURE 1 as a pressure booster valve. This valve is formed with spaced valve lands 352 and 354 which define a differential area. Control pressure can be distributed to this differential area through a passage 356. This passage 356 is pressurized during reverse drive operation for the purpose of augmenting the operating pressure level of the main regulator valve.

A converter pressure relief valve 360, which is located in passage 330, prevents an excessive supercharge of the torque converter circuit. It is designed to become uncovered when the magnitude of the torque converter circuit pressure reaches a value of approximately 70 p.s.i.

The converter check valve 334 will permit a pressure to develop in the torque converter circuit during operation. This pressure develops in advance of the build-up in the pressure in the control system as explained previously. The converter check valve also prevents draining of the fluid in the torus circuit of the converter through the cooler and through the rear lubrication oil circuit when the vehicle is not in use. In this respect the function of the converter check valve is similar to the function of the drain back valve.

For purposes of safety, a line pressure relief valve 362 is situated in communication with passage 300. It maintains a seal under the influence of spring pressure, however, until a back-pressure of 275 p.s.i. is achived. It normally is inoperative and assumes a closed position during normal operation of the control system.

A manual valve is designated generally by reference character 364. It includes a sintered metal valve element 366 situated within a cylindrical valve chamber 368. This valve element 366 is illustrated also in FIGURE 4A where it is shown in a position 90° out of phase with respect to the position shown in FIGURE 4.

Figure 4A:
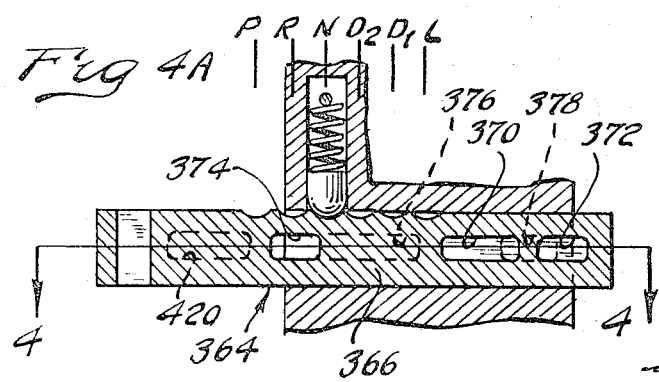
FIGURE 4A is a detail view of the manual valve of the system of FIGURES 2, 3, and 4.

As indicated in FIGURES 4 and 4A, valve element 366 includes a first cavity 370, a second cavity 372 and a third cavity 374. Unlike cavities 370 and 372, the cavity 374 extends through the valve and it establishes communication with another cavity 376 located 180° out of phase with respect to it.

Still another valve cavity 378 is situated opposite cavities 370 and 372 but 180° out of phase with respect to them.

The manual valve element 366 can be shifted to any one of several operating positions. Each position is indicated in FIGURE 4 by a reference legend. The various legends, identified as P, R, N, D2, D1, and L, respectively, identify the park position, reverse position, neutral position, second drive range position, first drive range position and the low speed ratio or manual low driving position. Valve element 366 can be adjusted as desired by a suitable driver operable mechanical linkage in the usual fashion.

The recesses in the manual valve element 366 define a plurality of valve lands that are identified separately by reference characters 380, 382, 384, 386, 388, 390, 392 and 394.

An exhaust port communicates with valve chamber 366 as shown at 395.

The manual valve element is indicated in the neutral position in FIGURE 2. When it assumes this position, valve land 392 blocks passage 396 which in turn communicates with line pressure passage 300. Also, land 384 blocks passage 398 which also communicates with line pressure passage 300. Under these conditions pressure distribution to the valve system is interrupted.

When the manual valve element 366 is shifted to the reverse position R, land 380 interrupts communication between passage 356 and the exhaust opening at the right hand end of the manual valve chamber. Land 384 uncovers passage 398. Land 386 moves across another passage 400 and interrupts communication between that passage and the exhaust port 395. Under these conditions control pressure is distributed from passage 398 to the recess 378. This pressure then passes from recess 378 to passage 400 through the annulus at the location where passage 400 communicates with valve chamber 368. Line pressure then passes from this passage 400 through the recess 372 to the passage 356. Pressure then is distributed to the differential area defined by valve lands 354 and 352 on the pressure booster valve. The resulting pressure force supplements the force applied to the regulator valve spool 310 by the spring 322, and a higher line pressure then is made available to the valve system. This increases the capacity of the reverse clutch and the reverse brake servo.

When passage 356 is pressurized in this fashion, pressure is distributed across an orifice 402 located in passage 356 and through the 2–3 shift valve to passage 404 which communicates directly with the reverse and direct front clutch pressure chamber. Pressure is distributed also from passage 404 through an orifice 406 which establishes communication between passage 404 and a passage 408 extending to the release side of an intermediate brake servo identified generally by reference character 410. This servo, however, normally assumes a released condition during reverse drive operation by reason of the action of servo spring 412. The introduction of pressure to the release side of the servo then simply augments the action of the spring 412.

The apply side of the intermediate servo is exhausted through a passage 414 which in turn communicates with a passage 416 through a 2–3 back-out valve. This passage 416 is exhausted through passage 418 which in turn communicates with an exhaust region through a cavity 420 formed in the manual valve element 366.

Communication between passage 416 and 418 is established by a three position check valve 422. This valve comprises a valve chamber 424 and three ports communicate with this valve chamber as indicated. A shiftable ball valve element 426 is located in chamber 424 and is adapted to register with any one of three ports. One of these three ports communicates with passage 418 as indicated and a second of these ports communicates with passage 416. A third port communicates with a passage 428, which in turn extends to the 1–2 shift valve, and is exhausted through an exhaust port 430.

Passage 400, as previously explained, also is pressurized during reverse drive operation. This passage communicates with a passage 432 through the 1–2 shift valve as indicated. Passage 432 in turn extends directly to the apply side of the reverse and low brake servo. It will be apparent therefore that the front clutch and the rear servo are both applied simultaneously. As explained previously, this establishes reverse drive operation.

The reverse and low servo comprises a cylinder 434 which is formed by a portion of the transmission housing. Slidably situated within this cylinder is a piston 436 which is urged in a left hand direction as viewed in FIGURE 3 by a servo spring 438. Piston 436 is connected by a threaded bolt to a piston stem 440 that is slidably received with a cooperating bore in the housing portion of which cylinder 434 forms a part. The extended end of stem 440 engages one end 442 of the brake band 64. The other end 444 of the brake band 64 is anchored by a suitable adjustable anchor member 446 that is connected in turn to the transmission housing.

Brake band 64 preferably is of the multiple wrap type so that it is self-energizing when the transmission is operated in the reverse drive range and during coasting. It is not self-energized, however, during operation under torque in the manual low drive range.

Stem 440 is formed with passage 448 which communicates with a pressure chamber 450 formed on one side of the piston 436. This chamber 450 is defined in part by a closure plate 452 secured to the cylinder 434. Passage 448 communicates with passage 432 through a suitable radial port which is elongated to establish communication between passage 432 and chamber 450 regardless of the position of the piston stem.

The intermediate brake servo comprises a servo cylinder 454 which may form a part of the transmission housing. Situated within this cylinder 454 is a shiftable piston 456. This piston is urged normally in a right hand direction, as viewed in FIGURE 3, by the servo spring 412.

A closure member 460 cooperates with piston 456 to define a pressure chamber 462. This chamber 462 communicates with passage 414 through an opening 464 formed in the piston stem 466. This stem is slidably received within a cooperating bore formed in a portion of the transmission housing. Communication between passage 464 and passage 414 is established by means of an elongated radial port.

The piston 456 cooperates also with the cylinder 454 to define a pressure release chamber 468 in the region of the spring 412. This chamber 468 communicates with passage 408 as indicated previously.

The effective area of chamber 468 is greater than the effective area of chamber 462 by reason of the stepped diameter of the piston 456. Thus when both chambers 468 and 462 are pressurized simultaneously, the brake servo will assume a release position.

If it is assumed that the manual valve element 366 is shifted to the D1 position, valve land 390 will uncover passage 398. Also valve land 394 will register with internal valve land 470 in the valve chamber 368. In a similar fashion valve land 388 will register with internal valve land 472. Passage 356 will be exhausted through the manual valve and through the exhaust opening at the right hand end of the manual valve chamber. Passage 400 likewise will be exhausted through that same exhaust flow path by reason of the communication established between the exhaust region and the passage 400 by recess 370 in the manual valve element 366.

Recess 376 in the manual valve element will establish communication between passage 398 and passages 474 and 476. Passage 418 on the other hand will be exhausted through the left hand end of the manual valve chamber.

Passage 474 distributes control pressure directly to the forward drive clutch servo by reason of the communication between it and the servo feed passage. Passage 474 communicates also with a branch passage 478 that communicates with the 1–2 shift valve chamber 480.

Situated within the 1–2 shift valve chamber is a multiple land valve spool 482 having spaced valve lands 484, 486, 488, 490 and 492. Valve land 490 is slightly larger than valve land 492 so that the pressure in passage 478 will establish a force on the valve element 482 which acts in an upward direction as viewed in FIGURE 2.

Passage 428, described previously, communicates with valve chamber 480 at a location adjacent valve land 490. It is exhausted, of course, through exhaust port 430 when the valve element 482 assumes the position shown in FIGURE 2. Passage 432 communicates with the shift valve chamber 480 through a branch passage 494 at a location adjacent valve land 488. When the valve element 482 assumes the position shown, direct communication is established between passages 400 and 494 through a flow restricting orifice.

A modulated throttle pressure passage 496 communicates with the shift valve chamber between lands 484 and 486. Land 484 is larger than the land 486 so that the pressure distributed through passage 496 will establish a pressure force which acts in an upward direction.

A forced down-shift or kick-down pressure passage 498 communicates also with the shift valve chamber 480 at a location adjacent valve land 486. This land blocks passage 498 when the valve element 482 assumes the position shown in FIGURE 2. Passage 498 communicates with the region between the valve lands 484 and 486, however, when the valve element 482 assumes a downward position corresponding to the upshifted condition of the valve.

Valve element 482 is urged normally in an upward direction by a valve spring 500. Rear brake servo pressure is distributed to the valve chamber in the region of the spring 500 through a branch passage 502 which communicates with passage 432.

It will be apparent therefore that as soon as the manual valve is moved to the D1 position, pressure will be made available immediately to the forward drive clutch. The other clutch and each of the brake servos, however, are de-energized. The transmission then is conditioned for forward drive operation and the driving torque reaction of the gear unit is accommodated by the overrunning coupling shown in part in FIGURE 1 at 68.

Acting upon the upper end of the 1–2 shift valve land 484 is a vehicle speed governor pressure signal which is distributed to the 1–2 shift valve through a governor pressure passage 504. This passage 504 extends to the primary governor valve which forms a part of the governor valve assembly 70. This primary governor valve comprises a multiple land valve spool 506 having multiple lands 508, 510 and 514. Land 508 is of greater diameter than the diameter of valve land 510. The valve spool 506 is situated within a governor valve chamber 516 which communicates with a passage 518. This passage 518 extends to a valve chamber 520 within which is situated a secondary valve element 522. This valve element is formed with valve lands 524 and 526, the diameter of the latter being greater than the diameter of the former. An exhaust port communicates with the chamber 520 as shown at 528.

Communicating also with the valve chamber 520 is the previously described passage 474.

The pressure made available to the secondary governor valve element acts upon the differential area formed by valve lands 524 and 526 and urges the valve element 524 radially inwardly.

At the same time the degree of communication between passage 518 and exhaust port 528 is reduced. The modulated pressure then established acts upon the differential area defined by valve lands 508 and 510 thereby urging the valve element 506 in a radially inward direction. When it assumes the innermost position, the valve element 506 will block passage 504 and interrupt communication between passage 504 and passage 518.

The magnitude of the pressure in passage 518 is an indicator of the driven speed of the power output shaft. At lower vehicle speeds, however, this pressure is not distributed to passage 504. Instead, passage 504 is exhausted through an exhaust port 532 that comunicates with a valve chamber 516.

When a predetermined vehicle speed is reached, the centrifugal force acting upon valve element 506 will urge the latter in a radially outward direction against the opposing force of the modulated pressure in passage 518. The centrifugal force acting upon the valve element 522, the pressure force and the spring force of spring 530 produce a resultant modulated pressure in passage 518 that then will be delivered to passage 504 at higher vehicle speeds. This pressure acts upon the upper end of valve element 484 of the 1–2 shift valve, as indicated previously.

Modulated throttle pressure passage 496 communicates with a throttle modulator valve chamber 534 located at one end of the 2–3 shift valve. Slidably situated within chamber 534 is a throttle modulator valve element 536 which is urged in a downward direction as viewed in FIGURE 3 by a valve spring 538. This valve spring is disposed between valve element 536 and the 2–3 shift valve as indicated.

The lower end of the valve element 536 communicates with a throttle booster valve passage 540 which in turn communicates with a throttle booster valve chamber 542 within which is slidably situated a booster valve element 544. Valve lands 546 and 548 are formed on valve element 544, the diameter of the latter being greater than the diameter of the former. A spring 550 normally urges the valve element 544 in a right-hand direction, as indicated.

Line pressure is distributed to the valve chamber 542 through branch passage 552 which communicates with the passage 300. Passage 552 normally is blocked, however, by land 546.

Secondary throttle valve pressure is distributed to chamber 542 through a passage 556. Branch portions of this passage 556 communicate directly with the right-hand side of land 548 and with the region between valve lands 548 and 546. As secondary throttle valve pressure increases in magnitude, the spring 550 will begin to yield. Land 548 then will progressively decrease communication between passage 556 and passage 540, and at the same time communication between passage 552 and passage 540 is progressively increased by reason of the action of valve land 546. Initially, direct communication is established between passage 556 and passage 540. When the magnitude of the pressure in passage 556 increases beyond a predetermined value, however, the pressure in passage 540 is augmented so that the resultant pressure is of greater magnitude than the pressure in passage 556.

As will be explained subsequently, the magnitude of the pressure in passage 556 is an indicator of the engine manifold pressure for the vehicle engine. Since the torque demand under driving conditions is not reflected accurately by changes in engine manifold pressure, it is necessary to augment the pressure 556 in the manner described so that the pressure in passage 540 will be a general or approximate indicator of the engine torque demand. The secondary throttle pressure in passage 556 is obtained by a secondary throttle valve which comprises a valve element 558 having spaced lands 560 and 562. These lands define a differential area since land 562 is of greater diameter than the diameter of valve land 560.

Valve element 558 is situated within a valve chamber 564. Valve element 558 is biased in a right-hand direction as viewed in FIGURE 4 by a valve spring 566.

Passage 556 communicates directly with passage 358 and with branch passages 568, the latter communicating with the secondary valve chamber in the region of spring 566 and with the differential area defined by valve lands 562 and 560.

Primary throttle valve pressure is distributed to the right-hand end of valve chamber 564 through primary throttle valve pressure passage 570. The pressure in passage 570 thus is reduced in magnitude by an amount that is determined by the calibration of spring 566. The reduced primary throttle valve pressure then is distributed to passage 568 and made available to passage 556.

Passage 570 communicates with a primary throttle valve which comprises a valve element 572 situated within a valve chamber 574. This valve element 572 comprises spaced valve lands 576 and 580. Line pressure passage 300 communicates with valve chamber 574 adjacent valve land 576. Passage 570 communicates also with the valve chamber 574 at a region intermediate valve lands 576 and 580. This pressure is distributed through a central bore 582 formed in element 572 to the left-hand end of the valve chamber 574. An exhaust port is shown at 584.

A vacuum diaphragm assembly is designated generally by reference character 586. It includes a flexible diaphragm 588 that is connected at its outer periphery to parts 590 and 592 which cooperate to define a cavity 594. Part 592 is in the form of a cup and it cooperates with diaphragm 588 to define a manifold pressure chamber 596. This chamber communicates with the engine intake manifold through a manifold pressure passage 598.

A servo spring 600 is located within the part 592 and acts against the diaphragm to urge the latter in a left-hand direction. The central hub portion of diaphragm 588 is connected to a force transmitting member 602. Disposed between this member 602 and the right-hand side of valve element 572 is a thrust element 604.

Part 590 is connected to an adaptor 606 which is threadably connected to the throttle valve case by means of a threaded connection 608. The manifold pressure force acting upon diaphragm 588 then will be transmitted through members 602 and 604 to the primary throttle valve element 572. When the engine manifold pressure is elevated, the element 572 will tend to shift in a left-hand direction to establish an increased degree of communication between passage 300 and passage 570. Simultaneously, the degree of communication between passage 570 and exhaust port 584 will be progressively decreased. The valve element 572 then will begin to modulate the pressure in passage 300 so that the pressure made available to passage 570 is a function of engine intake manifold pressure.

It will be apparent therefore that the spring force of spring 500 acting upon the 1–2 shift valve element 482 will be supplemented by the force of the modulated throttle valve pressure acting upon the differential area of valve lands 484 and 486. It will be supplemented also by the force of the line pressure acting upon the differential area of valve lands 490 and 492. When these combined forces are overcome by the force of the governor pressure acting upon the 1–2 shift valve element 482, the latter will shift in a downward direction as viewed in FIGURE 2. This immediately will cause the differential area defined by valve lands 494 and 492 to become exhausted through passage 502. The shifting movement of the shift valve can be characterized then as a snap action since the valve element will move quickly to the upshift position. Communication will be interrupted between passage 428 and the exhaust port 430 and communication will be established between passage 478 and passage 428. Passage 494, of course, communicates with the port 430 after the shift valve element assumes the upshift position. Furthermore, the passage 498, although it is exhausted under the conditions we now are describing, will be brought into communication with the differential area defined by valve lands 486 and 484.

Line pressure then will be distributed from passage 428 to passage 416. The valve 426 immediately will shift to block passage 418 and prevent dumping of line pressure through the exhaust port in the manual valve. Valve element 426 then is flow responsive and it automatically assumes any position that is necessary to prevent flow from a high pressure port to the exhaust region.

Line pressure then passes through the 2–3 backout valve from passage 416 to the passage 414, and through a flow restricting orifice in passage 414 to the apply side of the intermediate brake servo. This causes the intermediate brake band 142 to become applied, thereby anchoring the common sun gears to condition the gear mechanism for intermediate speed ratio operation. The overrunning coupling shown in part at 250 in FIGURE 1 overruns under these conditions.

The 2–3 shift valve comprises a valve chamber 614 within which is positioned a 2–3 shift valve spool 616. This valve spool includes spaced valve lands 618, 620, 622 and 624. Valve land 620 is slightly smaller in diameter than the diameter of valve land 622. Lands 16 and 18 may be equal in diameter.

Passage 356 communicates through orifice 402 with the valve chamber 614 at a region intermediate valve lands 618 and 620. Passage 404 communicates with this same region as previously indicated. Passage 476 communicates with the valve chamber 614 through a branch passage 626. A flow restricting orifice 628 is situated in passage 476 as indicated.

Passage 476 communicates with the differential area defined by valve lands 620 and 622.

Modulated throttle pressure is distributed to the lower end of the 2–3 shift valve element 616 through a branch passage 630. Each of the shift valves therefore is supplied with a common modulated throttle pressure.

When the magnitude of the governor pressure for any given engine intake manifold pressure reaches a sufficiently high value, the valve element 616 will be shifted in a downward direction as viewed in FIGURE 3. This immediately will cause the differential area defined by valve lands 620 and 622 to become exhausted through the passage 356 and through the communicating exhaust port in the manual valve. Land 622 will block passage 476. At the same time passage 476 will communicate with passage 404 through passage 626 and through the region between lands 618 and 620. Line pressure then will be distributed through the 2–3 shift valve to passage 404. This pressure then will be distributed through the 3–2 coasting control valve to passage 408 which in turn communicates with the release side of the intermediate brake servo.

Passage 404, as previously explained, communicates directly with passage 140 which feeds the direct drive clutch. Thus, since both clutches now are applied and both brakes are released, the transmission mechanism is conditioned for direct drive operation.

The 3–2 coasting control valve comprises a valve chamber 634 within which is positioned a valve element 636. This valve element is formed with two valve lands 638 and 640. It is urged normally in a downward direction by valve spring 642. Passage 404 communicates with the valve chamber 634 at a point intermediate valve lands 638 and 640. When the valve element 636 is in a downward position valve land 638 blocks passage 408 under these conditions.

Governor pressure acts upon the lower end of valve land 640 to urge the valve element 636 in an upward direction against the opposing force of spring 642. Spring 642 is caused to yield when the vehicle speed reaches a predetermined value. When this occurs direct communication is established between passages 404 and 408. When the 3–2 coasting control valve element 636 assumes a downward position, however, the communication between passages 404 and 408 is restricted by reason of the action of orifice 406.

When the vehicle is coasting in the direct drive ratio, the 2–3 shift valve ultimately will assume a downshift position when the governor pressure is insufficient to overcome the opposing forces acting on the valve element 616. Passage 356 then is brought into communication with passage 404 as previously explained. Under these conditions the release side of the intermediate brake servo is exhausted through passage 408, through passage 404 and then through passage 356 which communicates with the exhaust region. At high vehicle speeds, the orifice 406 will be by-passed and the rate of application of the intermediate brake servo will be more rapid than when a corresponding coasting downshift occurs at lower vehicle speeds. The intermediate brake servo then will be applied gently at the lower vehicle speeds and an undesirable harshness in the high speed ratio to intermediate speed ratio downshift is prevented.

In order to cushion the application of the direct drive clutch upon a speed ratio shift from the intermediate speed ratio to the direct drive ratio we have provided a 2–3 back-out valve. This valve comprises a valve chamber 644 within which is situated a 2–3 back-out valve element 646. This valve element is formed with two valve lands 648 and 650 and is urged in an upward direction as viewed in FIGURE 3 by a valve spring 652. The valve spring is seated upon a manual low valve element in the form of a shuttle valve piston 654. This element 654 is situated within the valve chamber 644.

The upper end of valve land 648 is subjected to the pressure in passage 404. Communicating also with the chamber 644 are the passages 416 and 414. When the valve element 646 assumes the position shown, free communication is established between passages 416 and 414. But communication is interrupted between passages 404 and 414.

The lower end of valve land 650 is subjected to primary throttle valve pressure which is distributed to valve chamber 644 through passage 570.

Upon a shift from the intermediate speed ratio to the direct drive ratio the upper end of the valve land 648 is pressurized with the pressure that is made available to the direct drive clutch. After the 2–3 shift valve has moved to an upshift position the pressure initially increases in passage 404 and in the communicating intermediate servo release chamber. At a predetermined increase in the magnitude of this pressure the valve element 646 will move in a downward direction as viewed in FIGURE 3 against the opposing force of the spring 652 and the opposing pressure force of the primary throttle valve pressure in passage 570. As soon as this stroking action occurs, passage 404 is brought into communication with passage 414. Thus the front servo apply pressure, which is equal to line pressure at this time, is connected to the clutch servo feed passage 140 and the servo release line 408. The intermediate servo piston then will begin to accumulate and move to an off position. The upshift then will occur at the low servo end point. That is, the clutch will become applied and the brake will become released at a lower pressure level than would otherwise be experienced without the action of the 2–3 back-out valve.

If the primary throttle valve pressure is increased in magnitude, the end point at which the upshift will occur will become greater. This makes certain that the transmission servo mechanisms will have sufficient pressure to maintain the torque transmitting capacity and prevent an undesirable interruption of the torque delivery path under driving conditions.

Under increased primary throttle pressure the intermediate servo will be stroked to the off position before the 2–3 back-out valve is shifted. The 2–3 back-out valve then is sensitive to any driving requirement to establish the optimum degree of timing between the release of the intermediate servo and the application of the direct drive clutch.

The manual low valve is pressurized by pressure that is distributed to the lower end of valve element 656 by a passage 457. This passage 457 communicates with passage 400 through a downshift valve. Passage 400 in turn is pressurized when the manual valve is shifted to the L position. Under these conditions valve land 390 uncovers passage 398 and establishes communication between passage 398 and the annulus with which passage 400 communicates. Thus when the transmission is shifted to the manual low range driving position the 2–3 back-out valve is returned to the position shown in FIGURE 3. On a manual low 3–2 coast shift, a slight reduction in the direct drive clutch pressure will cause the 3–2 back-out valve to stroke and allow line pressure to energize the intermediate servo apply chamber. If the manual low valve were not employed in this fashion, the intermediate servo apply chamber would not be pressurized with line pressure until the closed throttle end point, as determined by the calibration of the 2–3 back-out valve, would be reached. This would result in an objectionable time delay for the shift.

Upon movement of the manual valve to the L position, the pressure that then is made available to passage 400 is distributed also to the lower end of the 2–3 shift valve element 616 to urge the latter in an upward direction. The 1–2 shift valve element 648 also is urged in an upward direction by reason of the fact that line pressure will be caused to act upon the differential area defined by valve lands 486 and 484. Passage 400 will be brought into fluid communication with passage 432 and the pressure in the latter will act upon the lower end of the 1–2 shift valve spool by reason of the direct communication between passage 432 and the spring chamber that is provided by passage 502. Thus the rear servo will become applied simultaneously with the application of the forward drive clutch while the intermediate servo and the direct drive clutch are exhausted. The intermediate servo is exhausted through passages 414, 416 and 428, the latter communicating with the exhaust port 430 in the 1–2 shift valve chamber. The direct drive clutch is exhausted through the 2–3 shift valve and through passage 356 which in turn communicates with the exhaust port in the manual valve. The transmission will operate in a low speed range and will not upshift in the usual fashion. The low speed brake 216 will be capable of accommodating torque reaction in either direction so that hill braking can be obtained.

A forced downshift valve is situated in communication with passages 300 and passages 456. It includes a valve element 660 situated within a valve chamber 662. Valve element 660 includes valve lands 664 and 666. It is urged in a left-hand direction by a kickdown valve spring 668. The action of the spring 668 is supplemented by the pressure force of the secondary throttle pressure which is distributed to the right-hand end of the valve chamber 662 through a spring retainer plate 670.

The downshift valve normally will assume the position shown in FIGURE 4 during movement of the engine carburetor throttle valve throughout a range of positions less than the wide open throttle position. If it assumes a wide open position, however, the engine carburetor throttle valve linkage will cause the valve element 660 to shift in a right-hand direction. When this occurs line pressure is distributed from passage 300 to passage 457 and also to passage 498. Thus the manual low valve will be pressurized as before and also each of the shift valves will be shifted to the downshift position to force a downshift. When the downshift valve is moved against its spring in this fashion, the transmission will be conditioned for maximum acceleration for the prevailing road conditions The primary throttle valve is calibrated to satisfy the requirements of the 2–3 back-out valve. These requirements are not necessarily compatible with the requirements of the shift valve.

To satisfy the requirements of the 2–3 shift valve the output pressure of the secondary throttle valve again is modified by the throttle booster valve in the manner previously described. The 2–3 shift valve and the 1–2 shift valve then sense the approximate degree of torque demand as distinguished from the actual engine output torque measured by the manifold pressure.

To maintain the necessary clutch and brake servo capacity upon changes in engine torque and to provide the necessary reduction in line pressure for any given engine throttle setting as the vehicle speed increases, I have provided a valve arrangement that includes a boost control amplifier valve, a boost control valve and a mechanical throttle valve. The output pressure of this auxiliary system is distributed through a passage 700 and through an orifice 702 to the lower end of the valve land 354 of the main regulator valve assembly. Primary throttle valve output pressure is distributed directly to this system through a passage 704 which communicates with passage 570.

A mechanical throttle valve is identified generally by reference character 706. It includes a valve chamber 708 within which is positioned a valve spool 710 having formed thereon valve lands 712 and 714. This spool is urged in a left-hand direction by a valve spring 716 situated between the spool 710 and a plunger 718. This plunger is slidably situated within a cooperating valve opening 720 which communicates with valve chamber 708. An exhaust port 722 communicates with the left-hand end of the valve opening 720.

A stem 724 extends from one end of the plunger 718. A valve land 726 slidably positioned on stem 724 is biased away from plunger 718 by a spring 728. Spring 728 urges member 726 into engagement with a snap ring carried by the stem 724.

A linkage element 730 engages the member 726. This element 730 forms a part of the linkage system for actuating the engine carburetor throttle valve. Upon movement of the carburetor valve toward an open position, element 730 is moved in a left-hand direction as viewed in FIGURE 3. A stop 732 is secured to the valve body of which the mechanical throttle valve 706 forms a part. This stop limits the degree of movement of the linkage element 730 in a right-hand direction as viewed in FIGURE 3.

A lost motion connection may be provided between the engine throttle actuating elements and the element 730 so that initial movement of the engine throttle from a closed position to a position corresponding to approximately 20° will not result in any movement of the element 730. Continued movement beyond the 20° position however, will cause element 730 to urge in a left-hand direction the assembly that includes plunger 718, spring 728 and member 726. This motion continues until the plunger 718 engages the shoulder 734 formed at the left-hand of the opening 720. This engagement occurs when the engine carburetor throttle valve assumes approximately a 50° opening. Continued movement of the engine throttle valve beyond the 50° position then will result in compression of the spring 728 as the member 726 slides along the stem 724.

Valve chamber 708 is provided with an exhaust port 736 that is controlled by a land 714. A pressure supply passage 738 communicates with the chamber 708 and is controlled by the land 712. Passage 738 communicates with line pressure passage 300. A mechanical throttle valve output pressure passage 740 communicates with the chamber 708 at a point intermediate lands 712 and 714. This passage is in communication with the left-hand side of the land 714 through a bore 742 formed in the spool 710.

The mechanical throttle valve thus will modulate the pressure in passage 738 to produce a resultant pressure in passage 740 whose magnitude is determined by the degree of compression of spring 716. This in turn is proportional to engine carburetor throttle valve movement between the 20° setting and the 50° setting. The pressure in passage 740 is insensitive, however, to engine throttle movement between the zero throttle setting and the 20° setting and to engine throttle movement beyond the 50° setting.

The pressure signal of the mechanical throttle valve is distributed through passage 740 to the boost control valve shown at 744. This valve comprises a valve chamber 746 within which is slidably situated a valve spool 748 having spaced valve lands 750 and 752. Primary throttle valve pressure is distributed from passage 704 to the upper end of land 750 and also to a port 754. Line pressure is distributed to the chamber 746 through a branch passage 756 which communicates directly with line pressure passage 300. The output pressure on the boost control valve is distributed to a passage 758. This passage communicates with the valve chamber 746 at a point intermediate the lands 750 and 752. The pressure in passage 758 is distributed to an internal bore 760 through a radial port. This pressure normally tends to urge the spool 748 in an upward direction as viewed in FIGURE 3. The size of the bore 760 can be chosen so that a pressure balance between the forces established by the pressure in passage 758 and the pressure in passage 704 is maintained. This pressure thus acts as a rateless spring.

A piston 762 is slidably situated in the bore 760. It is subjected at its lower end to the pressure in passage 740. The pressure in passage 740 tends to urge the valve spool 748 in an upward direction thereby normally establishing communication between passage 704 and passage 758. When the magnitude of the pressure in passage 704 reaches a predetermined value, passage 756 is brought into communication with passage 758 and the degree of communication between passage 704 and passage 758 is decreased. This result in an augmentation of the pressure in passage 758.

The boost control amplifier valve is shown at 764. It includes a valve spool 766 having a pair of spaced valve lands 768 and 770. This spool is biased normally in a left-hand direction as viewed in FIGURE 2 by a valve spring 772. It is slidably situated within a valve chamber 774, the left-hand end of which communicates with passage 758. When the valve spool 766 assumes the left-hand position, communication is established between passage 758 and the passage 776. That passage in turn communicates with passage 700 described previously. Passage 776 communicates also with the right-hand end of a valve plunger 778 that is slidably situated within a suitable valve sleeve located in the right-hand end of the chamber 774. This plunger engages a valve stem 780 carried by the spool 766.

Line pressure is distributed from passage 300 to the chamber 774 through a passage 782.

The boost control amplifier valve can be rendered ineffective during reverse drive operation by means of fluid pressure distributed from passage 784 to the right-hand side of the spool 766. Passage 784 receives its pressure from reverse line boost pressure passage 356. Passage 356 is exhausted except during reverse drive operation.

When the pressure passage 758 approaches a predetermined value, the lands 768 and 770 progressively decrease the degree of communication between passage 758 and passage 776 while progressively increasing the degree of communication between passage 776 and passage 782. This results in an augmentation of the pressure in passage 776 which is made available to the main regulator valve to produce an increase in the regulated line pressure. The boost control amplifier valve thus is effective to augment the signal made available by the boost control valve.

The point at which the boost control valve begins to function is determined by the position of the mechanical T.V. valve. At increased engine throttle settings the manifold vacuum at which the break point occurs is decreased as the engine carburetor throttle valve setting is increased. This characteristic is illustrated in FIGURE 5.

The influence of the mechanical throttle valve signal on the line pressure at various road speeds is indicated in FIGURE 6. It will be observed that the break point moves progressively to the right, which corresponds to increasing turbine shaft speed, as the engine throttle setting is increased. It is apparent also from FIGURE 6 that the line pressure will be increased to satisfy the torque multiplication of the hydrokinetic converter at low speeds. As speed increases, the line pressure maintained by the regulator is decreased sharply until a break point is reached. Thereafter, it is influenced only by the primary throttle valve pressure.

If we now assume that the manual valve is moved to the D2 position, land 392 will uncover passage 396 and land 394 will seal the left-hand end of the manual valve chamber. Line pressure then will be distributed from passage 396 directly to passage 418. The ball valve element 426 will assume the position shown in FIGURE 3. Pressure then will be distributed directly from passage 418 through the valve chamber 424 to the passage 416. The pressure then passes from passage 416 through the 2–3 backout valve to passage 414 which causes the intermediate brake servo to become applied. Since the sun gears then become anchored, the transmission will not be capable of shifting to the low speed position. The transmission then will begin its acceleration cycle from the intermediate speed ratio range and only a single upshift can be obtained.

Figure 7:
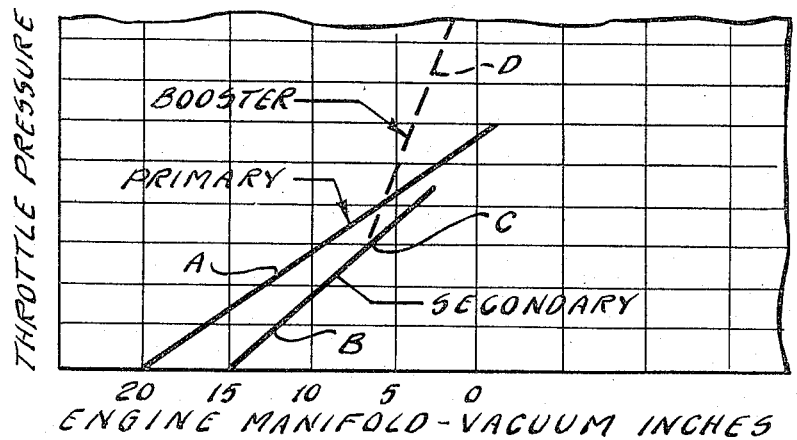
FIGURE 7 is a graph showing the relationship between engine manifold pressure and throttle pressure.

In FIGURE 7 is illustrated graphically the variation in throttle pressure with the changes in engine manifold vacuum. The primary throttle valve pressure will vary as indicated by the line A. Typical values of engine manifold vacuum are represented along the abscissa. The secondary throttle valve pressure is of a reduced order of magnitude in comparison to the primary throttle valve pressure. This is due to the action of the secondary throttle valve. The magnitude of this secondary throttle pressure will increase along a line B until it reaches point C. At this time the booster valve element will become shifted so that the effective output pressure of the throttle booster valve will be augmented before it is distributed to the shift valve. The augmented booster valve pressure is indicated by the dotted line D.

Figure 8:
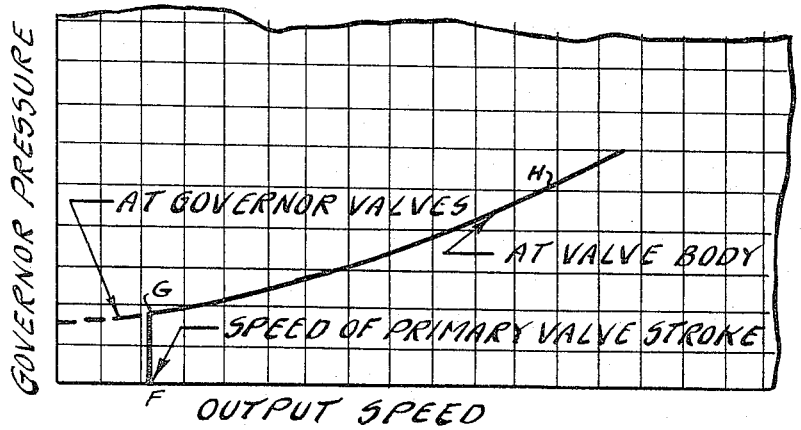
FIGURE 8 shows the relationship between driven speed and governor pressure.

In FIGURE 8 we have illustrated graphically the variation in governor pressure with changing vehicle speed. The governor pressure that is made available to passage 504 is of a zero magnitude until the vehicle speed reaches a value indicated by the symbol F. At that time the primary governor shifts in a radially outward direction with a snap action. The modulated pressure in passage 518 then immediately is made available to passage 504 and the governor pressure inceases in magnitude to a value represented by the symbol G. Further increases in speed then will cause a variation in the governor pressure in passage 504, as indicated by the governor pressure curve H.

In the control circuit the shift from the low speed ratio to the high speed ratio will occur following movement of the primary governor valve element to a radially outward position. The throttle modulator valve modulates throttle pressure to prevent a 2–3 shift delay and a 1–2 shift delay until a specific throttle pressure is obtained.

Governor pressure also controls the action of the 3–2 coasting control valve as explained previously. The 3–2 coasting control valve prevents an undesirable tie-up between the intermediate servo and the direct drive clutch. It would delay the application of the intermediate servo until the drive clutch has been released on a closed throttle 3–2 downshift in the D2 drive range only.

When the 2–3 shift valve is actuated to initiate a 3–2 coasting downshift, pressure drops in both the direct drive clutch and the release side of the intermediate servo. At a certain point the 2–3 backout valve spring will stroke the valve. At this time the apply side of the intermediate servo becomes pressurized with line pressure and the servo piston strokes quickly to a release position. This forces release oil into the clutch feed line through the 3–2 coasting control valve orifice 406. If it were not for the function of this orifice, a pressure would be maintained in the clutch under these conditions that would be sufficient to maintain the clutch applied. This is due to the low engine torque that prevails during coasting operation. The intermediate brake band then would apply before the clutch would become disengaged, and a tie-up condition would result.

Having thus described a preferred embodiment of my invention, what we claim and desire to secure by U.S. Letters Patent is:

1. In an automatic control valve system for use with fluid pressure operated servos, a main source of fluid pressure, a conduit structure interconnecting said main source and said servos, fluid pressure distributor valve means disposed in and partly defining said conduit structure for distributing pressure selectively to said servos, a source of a first pressure signal that is related in magnitude to an operating variable, regulator valve means communicating with said main source for establishing a controlled pressure level in said servos, a source of a second pressure signal that is proportional in magnitude to a second operating variable, an auxiliary pressure passage in fluid communication with said conduit structure interconnecting said first signal source and said regulator valve means, a boost control valve means disposed in and partly defining said auxiliary passage for regulating the pressure in said conduit structure and comprising a valve chamber, a movable valve element in said valve chamber, and means for subjecting opposed areas of said valve element respectively to a separate one of said signals whereby said valve element moves from a first pressure regulating position to a second non-regulating position as the relative magnitudes of said signals vary, said valve element communicating with a portion of said auxiliary passage that is proximate to said regulator valve means whereby the latter is subjected to the controlled output pressure of said boost control valve means, said regulator valve means responding to changes in the magnitude of the pressure in said auxiliary passage to produce a resultant servo pressure that is sensitive to variations in the magnitude of said first signal for any given value of said second signal.

2. In an automatic control valve system for use with fluid pressure operated servos, a main source of fluid pressure, conduit structure interconnecting said main source and said servos, fluid pressure distributor valve means disposed in and partly defining said conduit structure for distributing pressure selectively to said servos, a source of a first pressure signal that is related in magnitude to an operating variable, regulator valve means communicating with said main source for establishing a controlled pressure level in said servos, a source of a second pressure signal that is proportional in magnitude to a second operating variable, an auxiliary pressure passage in fluid communication with said conduit structure interconnecting said first signal source and said regulator valve means, a boost control valve means disposed in and partly defining said auxiliary passage for modulating the pressure in said auxiliary passage and comprising a valve chamber, a movable valve element in said valve chamber, means for subjecting opposed areas of said valve element respectively to a separate one of said signals whereby said valve element moves from a first pressure regulating position to a second non-regulating position as the relative magnitudes of said signals vary, said regulator valve means responding to changes in the magnitude of the pressure in said auxiliary passage to produce a resultant servo pressure that is sensitive to variations in the magnitude of said first signal for any given value of said second signal, said valve element being bipartite in form and including a bore having a geometric axis situated in the direction of movement of said valve element, and a movable plunger in said bore cooperating therewith to define a cavity, the portion of said auxiliary passage proximate to said regulator valve means being in fluid communication with said cavity whereby the controlled output pressure of said boost control valve means modifies the controlled pressure level established by said regulator valve means, said second signal acting upon one end of said plunger in opposition to a force created on said plunger by the pressure in said proximate portion.

3. In an automatic control valve system for use with fluid pressure operated servos, a main source of fluid pressure, conduit structure including a high pressure region interconnecting said main source and said servos, fluid pressure distributor valve means disposed in and partly defining said conduit structure for distributing pressure selectively to said servos, a source of a first pressure signal that is related in magnitude to an operating variable, regulator valve means communicating with said high pressure region for establishing a controlled pressure level in said servos, a souce of a second pressure signal that is proportional in magnitude to a second operating variable, an auxiliary pressure passage interconnecting said first signal source and said regulator valve means, a boost control valve means disposed in and partly defining said auxiliary passage for modulating the pressure in said auxiliary passage and comprising a valve chamber, a movable valve element in said valve chamber, means for subjecting opposed areas of said valve element respectively to a separate one of said signals whereby said valve element moves from a first pressure regulating position to a second non-regulting position as the relative magnitudes of said signals vary, said valve element communicating with a portion of said auxiliary passage that is proximate to said regulator valve means, said regulator valve means responding to changes in the magnitude of the pressure in said auxiliary passage to produce a resultant servo pressure that is sensitive to variations in the magnitude of said first signal for any given value of said second signal, and modulator valve means situated in said proximate passage portion and communicating with said high pressure region of said conduit structure for modulating the pressure in said high pressure region in response to changes in the output pressure of said boost control valve means, said regulator valve means and said modulator valve means being in fluid communication whereby said controlled pressure level is varied in response to changes in the magnitude of said signals.

4. In an automatic control valve system for use with fluid pressure operated servos, a main source of fluid pressure, conduit structure including a high pressure region interconnecting said main source and said servos, fluid pressure distributor valve means disposed in and partly defining said conduit structure for distributing pressure selectively to said servos, a source of a first pressure signal that is related in magnitude to an operating variable, regulator valve means communicating with said main source for establishing a controlled pressure level in said servos, a source of a second pressure signal that is proportional in magnitude to a second operating variable, an auxiliary pressure passage interconnecting said first signal source and said regulator valve means, a boost control valve means disposed in and partly defining said auxiliary passage for modulating the pressure in said auxiliary passage and comprising a valve chamber, a movable valve element in said valve chamber, means for subjecting opposed areas of said valve element respectively to a separate one of said signals whereby said valve element moves from a first pressure regulating position to a second non-regulating position as the relative magnitudes of said signals vary, said regulator valve means responding to changes in the magnitude of the pressure in said auxiliary passage to produce a resultant servo pressure that is sensitive to variations in the magnitude of said first signal for any given value of said second signal, said valve element being bipartite in form and including a bore having a geometric axis situated in the direction of movement of said valve element, a movable plunger in said bore cooperating therewith to define a cavity, the portion of said auxiliary passage proximate to said regulator valve means being in fluid communication with said cavity, said second signal acting upon one end of said plunger in opposition to a force created on said plunger by the pressure in said proximate portion, and modulator valve means situated in said proximate passage portion and communicating with said high pressure region of said conduit structure for modulating the pressure in said high pressure region in response to changes in the output pressure of said boost control valve means, said regulator valve means and said modulator valve means being in fluid communication whereby said controlled pressure level is varied in response to changes in the magnitude of said signals.

5. A control system for a power transmission mechanism adapted to deliver driving torque from a throttle controlled internal combustion engine having a throttle controlled air-fuel mixture intake manifold to a driven member, torque delivery gear elements defining plural torque delivery paths between said engine and said driven member, clutch and brake means for controlling the relative motion of said gear elements to establish various speed ratios, a fluid pressure source, fluid pressure operated servo means for actuating said clutch and brake means, a fluid pressure source, conduit structure including a high pressure region interconnecting said fluid pressure source and said servos and including distributor valve means for selectively distributing control pressure to said servos, primary throttle valve means communicating with said high pressure region and with said intake manifold for producing a pressure signal that is proportional in magnitude to intake manifold pressure, regulator valve means communicating with said pressure source for maintaining a predetermined operating pressure level in said conduit structure, an auxiliary passage interconnecting said regulator valve means and said primary throttle valve means whereby the former is sensitive to changes in said pressure signal, a second throttle valve means connected mechanically to said engine throttle and communicating with a high pressure region of said circuit for producing a pressure signal that is proportional in magnitude to the degree of movement of said engine throttle, boost control valve means disposed in and partly defining said auxiliary passage and communicating with the high pressure region of said conduit structure for modulating the pressure in said auxiliary passage to produce changes in the operating pressure level maintained by said regulator valve means, said boost control valve means communicating with each of said signals and responsive to changes in relative magnitudes thereof to produce unrestricted pressure distribution through said auxiliary passage means when the difference in magnitude of said signals is less than a predetermined value and for producing a regulated pressure level in said auxiliary passage means when said difference is greater than said predetermined value.

6. A control system for a power transmission mechanism adapted to deliver driving torque from a throttle controlled internal combustion engine having a throttle controlled air-fuel mixture intake manifold to a driven member, torque delivery gear elements defining plural torque delivery paths between said engine and said driven member, clutch and brake means for controlling the relative motion of said gear elements to establish various speed ratios, a fluid pressure source, fluid pressure operated servo means for actuating said clutch and brake means, a fluid pressure source, conduit structure including a high pressure region interconnecting said fluid pressure source and said servos and including distributor valve means for selectively distributing control pressure to said servos, primary throttle valve means communicating with said high pressure region of said circuit and with said intake manifold for producing a pressure signal that is proportional in magnitude to intake manifold pressure, regulator valve means communicating with said pressure source for maintaining a predetermined operating pressure level in said conduit structure, an auxiliary passage interconnecting said regulator valve means and said primary throttle valve means whereby the former is sensitive to changes in said pressure signal, a second throttle valve means connected mechanically to said engine throttle and communicating with a high pressure region of said circuit for producing a pressure signal that is proportional in magnitude to the degree of movement of said engine throttle, boost control valve means disposed in and partly defining said auxiliary passage and communicating with the high pressure region of said conduit structure for modulating the pressure in said auxiliary passage to produce changes in the operating pressure level maintained by said regulator valve means, said boost control valve means communicating with each of said signals and responsive to changes in relative magnitudes thereof to produce unrestricted pressure distribution through said auxiliary passage means when the difference in magnitude of said signals is less than a predetermined value and for producing a regulated pressure level in said auxiliary passage means when said difference is greater than said predetermined value, said boost control valve means including a movable valve element capable of assuming a first non-regulating position and a second regulating position, said second signal acting upon one area of said valve to urge it toward a non-regulating position, said first signal acting upon an opposed area of said valve element to urge it toward the regulating position, and a third area of said valve element being subjected to the regulated pressure in said auxiliary passage means.

7. A control system for a power transmission mechanism adapted to deliver driving torque from a throttle controlled internal combustion engine having a throttle controlled air-fuel mixture intake manifold to a driven member, torque delivery gear elements defining plural torque delivery paths between said engine and said driven member, clutch and brake means for controlling the relative motion of said gear elements to establish various speed ratios, a fluid pressure source, fluid pressure operated servo means for actuating said clutch and brake means, a fluid pressure source, conduit structure including a high pressure region interconnecting said fluid pressure source and said servos and including distributor valve means for selectively distributing control pressure to said servos, primary throttle valve means communicating with said high pressure region of said circuit and with said intake manifold for producing a pressure signal that is proportional in magnitude to intake manifold pressure, regulator valve means communicating with said pressure source for maintaining a predetermined operating pressure level in said conduit structure, an auxiliary passage interconnecting said regulator valve means and said primary throttle valve means whereby the former is sensitive to changes in said pressure signal, a second throttle valve means connected mechanically to said engine throttle and communicating with a high pressure region of said circuit for producing a pressure signal that is proportional in magnitude to the degree of movement of said engine throttle, boost control valve means disposed in and partly defining said auxiliary passage and communicating with the high pressure region of said conduit structure for modulating the pressure in said high pressure region to establish a modulated pressure output in said auxiliary passage thus producing changes in the operating pressure level maintained by said regulator valve means, said boost control valve means communicating with each of said signals and responsive to changes in relative magnitudes thereof to produce unrestricted pressure distribution from said primary throttle valve means through said auxiliary passage means when the difference in magnitude of said signals is less than a predetermined value and for producing said modulated pressure output in said auxiliary passage means when said difference is greater than said predetermining value, said boost control valve means comprising a movable valve element capable of assuming a first non-regulating position and a second regulating position, a bore in said valve element having its axis arranged in the direction of movement of said valve element, and a plunger in said bore cooperating therewith to define a cavity, said second pressure signal acting on one end of said plunger valve element to urge said valve element toward a non-regulating position, said first signal acting upon an opposed area of said valve element to urge it toward a regulating position, the pressure in said auxiliary passage means communicating with said cavity.

8. A control system for a power transmission mechanism adapted to deliver driving torque from a throttle controlled internal combustion engine having a throttle controlled air-fuel mixture intake manifold to a driven member, torque delivery gear elements defining plural torque delivery paths between said engine and said driven member, clutch and brake means for controlling the relative motion of said gear elements to establish various speed ratios, a fluid pressure source, fluid pressure operated servo means for actuating said clutch and brake means, a fluid pressure source, conduit structure including a high pressure region interconnecting said fluid pressure source and said servos and including distributor valve mean for selectively distributing control pressure to said servos, primary throttle valve means communicating with said high pressure region and with said intake manifold for producing a pressure signal that is proportional in magnitude to intake manifold pressure, regulator valve means communicating with said pressure source for maintaining a predetermined operating pressure level in said conduit structure, an auxiliary passage interconnecting said regulator valve means in said primary throttle valve means whereby the former is sensitive to changes in said pressure signal, a second throttle valve means connected mechanically to said engine throttle and communicating with a high pressure region of said circuit for producing a pressure signal that is proportional in magnitude to the degree of movement of said engine throttle, boost control valve means disposed in and partly defining said auxiliary passage and communicating with the high pressure region of said conduit structure for modulating the pressure in said high pressure region to establish a modulated pressure output in said auxiliary passage to thus producing changes in the operating pressure level maintained by said regulator valve means, said boost control valve means communicating with each of said signals and responsive to changes in relative magnitudes thereof to produce unrestricted pressure distribution from said primary throttle valve means through said auxiliary passage means when the difference in magnitude of said signals is less than a predetermined value and for producing said modulated pressure output in said auxiliary passage means when said difference is greater than said predetermined value, and amplifier valve means situated in said auxiliary passage and communicating with said high pressure region of said conduit structure and with said boost control valve means for producing a modified signal that is made available to said pressure regulator valve means through said auxiliary passage means.

9. A control system for a power transmission mechanism adapted to deliver driving torque from a throttle controlled internal combustion engine having a throttle controlled air-fuel mixture intake manifold to a driven member, torque delivery gear elements defining plural torque delivery paths between said engine and said driven member, clutch and brake means for controlling the relative motion of said gear elements to establish various speed ratios, a fluid pressure source, fluid pressure operated servo means for actuating said clutch and brake means, a fluid pressure source, conduit structure including a high pressure region interconnecting said fluid pressure source and said servos and including distributor valve means for selectively distributing control pressure to said servos, primary throttle valve means communicating with said high pressure region and with said intake manifold for producing a pressure signal that is proportional in magnitude to intake manifold pressure, regulator valve means communicating with said pressure source for maintaining a predetermined operating pressure level in said conduit structure, an auxiliary passage interconnecting said regulator valve means and said primary throttle valve means whereby the former is sensitive to changes in said pressure signal, a second throttle valve means connected mechanically to said engine throttle and communicating with a high pressure region of said circuit for producing a pressure signal that is proportional in magnitude to the degree of movement of said engine throttle, boost control valve means disposed in and partly defining said auxiliary passage and communicating with the high pressure region of said conduit structure for modulating the pressure in said high pressure region to establish a modulated pressure output in said auxiliary passage thus producing changes in the operating pressure level maintained by said regulator valve means, said boost control valve means communicating with each of said signals and responsive to changes in relative magnitudes thereof to produce unrestricted pressure distribution from said primary throttle valve means through said auxiliary passage means when the difference in magnitude of said signals is less than a predetermined value and for producing said modulated pressure output in said auxiliary passage means when said difference is greater than said predetermined value, said boost control valve means including a movable valve element capable of assuming a first non-regulating position and a second regulating position, said second signal acting upon one area of said valve to urge it toward a non-regulating position, said first signal acting upon an opposed area of said valve element to urge it toward the regulating position, and a third area of said valve element being subjected to the modulated pressure output in said auxiliary passage means, and amplifier valve means situated in said auxiliary passage and communicating with said high pressure region of said conduit structure and with said boost control valve means for producing a modified signal that is made available to said pressure regulator valve means through said auxiliary passage means.

10. A control system for a power transmission mechanism adapted to deliver driving torque from a throttle controlled internal combustion engine having a throttle controlled air-fuel mixture intake manifold to a driven member, torque delivery gear elements defining plural torque delivery paths between said engine and said driven member, clutch and brake means for controlling the relative motion of said gear elements to establish various speed ratios, a fluid pressure source, fluid pressure operated servo means for actuating said clutch and brake means, a fluid pressure source, conduit structure including a high pressure region interconnecting said fluid pressure source and said servos and including distributor valve means for selectively distributing control pressure to said servos, primary throttle valve means communicating with said high pressure region and with said intake manifold for producing a pressure signal that is proportional in magnitude to intake manifold pressure, regulator valve means communicating with said pressure source for maintaining a predetermined operating pressure level in said conduit structure, an auxiliary passage interconnecting said regulator valve means and said primary throttle valve means whereby the former is sensitive to changes in said pressure signal, a second throttle valve means connected mechanically to said engine throttle and communicating with a high pressure region of said circuit for producing a pressure signal that is proportional in magnitude to the degree of movement of said engine throttle, boost control valve means disposed in and partly defining said auxiliary passage and communicating with the high pressure region of said conduit structure for modulating the pressure in said high pressure region to establish a modulated pressure output in said auxiliary passage thus producing changes in the operating pressure level maintained by said regulator valve means, said boost control valve means communicating with each of said signals and responsive to changes in relative magnitudes thereof to produce unrestricted pressure from said primary throttle valve means through said auxiliary passage means when the difference in magnitude of said signals is less than a predetermined value and for producing said modulated pressure output in said auxiliary passage means when said difference is greater than said predetermined value, said boost control valve means comprising a movable valve element capable of assuming a first non-regulating position and a second regulating position, a bore in said valve element having its axis arranged in the direction of movement of said valve element, a plunger in said bore cooperating therewith to define a cavity, said second pressure signal acting on one end of said plunger valve element to urge said valve element toward a non-regulating position, said first signal acting upon an opposed area of said valve element to urge it toward a regulating position, said pressure output in said auxiliary passage means being distributed to said cavity, and amplifier valve means situated in said auxiliary passage and communicating with said high pressure region of said conduit structure and with said boost control valve means for producing a modified signal that is made available to said pressure regulator valve means through said auxiliary passage means.

References Cited by the Examiner

UNITED STATES PATENTS

| | | | |
|---|---|---|---|
| 2,821,095 | 1/1958 | Kelley | 74—645 |
| 2,912,876 | 11/1959 | Chapman et al. | 74—472 |
| 2,971,405 | 2/1961 | Flinn | 74—752 |
| 3,003,367 | 10/1961 | Winchell | 74—688 |
| 3,103,831 | 9/1963 | De Corte et al. | 74—677 |
| 3,110,198 | 11/1963 | Borman | 74—688 |
| 3,117,464 | 1/1964 | Ivey | 74—472 |

DAVID J. WILLIAMOWSKY, *Primary Examiner.*

J. R. BENEFIEL, *Assistant Examiner.*